United States Patent [19]

Kalami

[11] Patent Number: 5,317,931
[45] Date of Patent: Jun. 7, 1994

[54] APPARATUS FOR SENSING DEFLECTION IN A CRASH TEST DUMMY THORAX

[75] Inventor: Hoshman Kalami, Novi, Mich.

[73] Assignee: First Technology Safety Systems, Inc., Plymouth, Mich.

[21] Appl. No.: 883,656

[22] Filed: May 15, 1992

[51] Int. Cl.⁵ .................................................. G01B 3/10
[52] U.S. Cl. ....................................... 73/866.4; 33/760
[58] Field of Search ................. 73/866.4; 33/732–734, 33/736, 743, 754, 755, 760–762, 764

[56] References Cited

U.S. PATENT DOCUMENTS

| | | |
|---|---|---|
| 3,841,163 | 10/1974 | Daniel . |
| 4,161,874 | 7/1979 | Specker et al. . |
| 4,286,386 | 9/1981 | Long .................................... 33/755 |
| 4,409,835 | 10/1983 | Daniel et al. . |
| 4,691,556 | 9/1987 | Mellander et al. . |
| 4,701,132 | 10/1987 | Groesch et al. . |
| 4,779,212 | 10/1988 | Levy ...................................... 33/755 |
| 4,873,867 | 10/1989 | McPherson et al. . |
| 5,119,521 | 6/1982 | Clontz ................................... 33/760 |

Primary Examiner—Robert Raevis
Attorney, Agent, or Firm—Howard & Howard

[57] ABSTRACT

A sensor for measuring the deflection of a thorax of an anthropomorphic dummy includes a base for mounting on a thoracic spine assembly, a tape drum rotatably mounted on the base, at least a pair of spring tapes each having one end connected to the base and an opposite end attached to the tape drum, the spring tapes biasing the tape drum for rotation in a predetermined direction, and a displacement tape having one end attached to and being wound about the tape drum in a direction opposite the predetermined direction and having an opposite end for attachment to a rib set of the dummy. The sensors are mounted in four pairs on the spine assembly and the opposite end of the displacement tapes of each pair are attached together to a different point on the rib set. The sensors in each pair are spaced apart a first predetermined distance along a Y axis and a ninth sensor is spaced a second predetermined distance from one of the other sensors along a Z axis. Deflection of the rib set toward the thoracic spine assembly will cause the tape drums to rotate in the predetermined direction to wind up the displacement tapes to indicate the deflection of the rib set through triangulation.

20 Claims, 4 Drawing Sheets

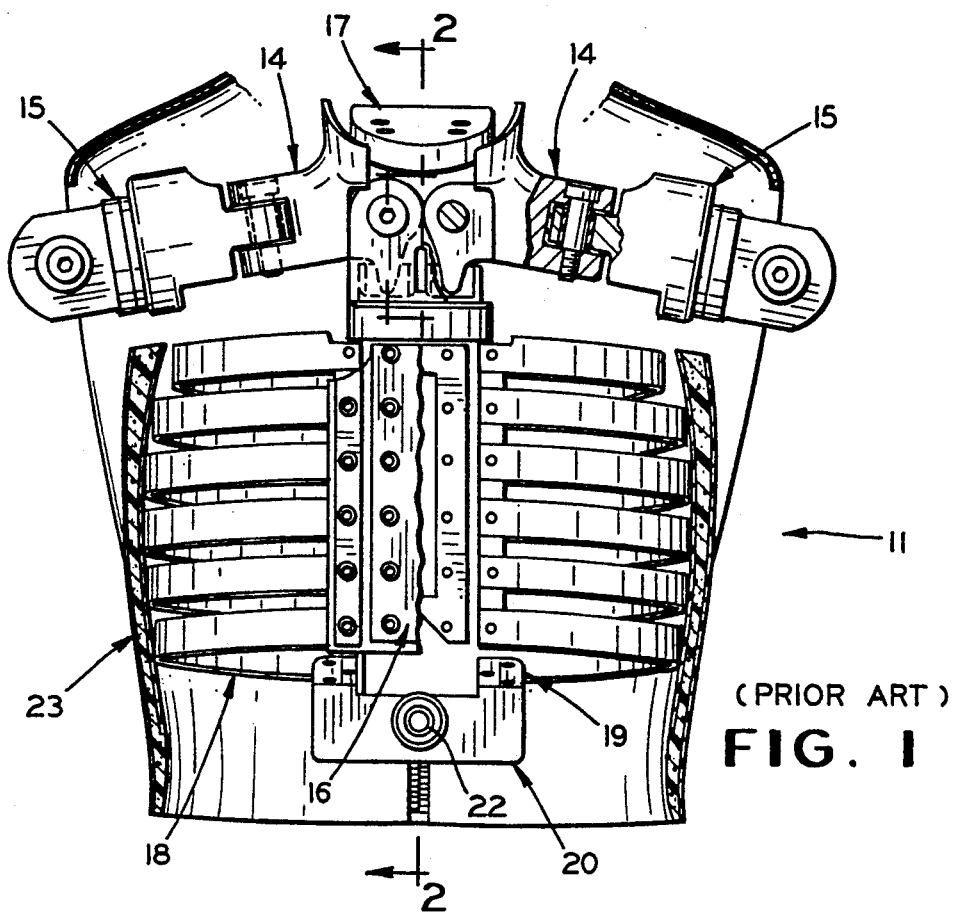
(PRIOR ART) FIG. 1
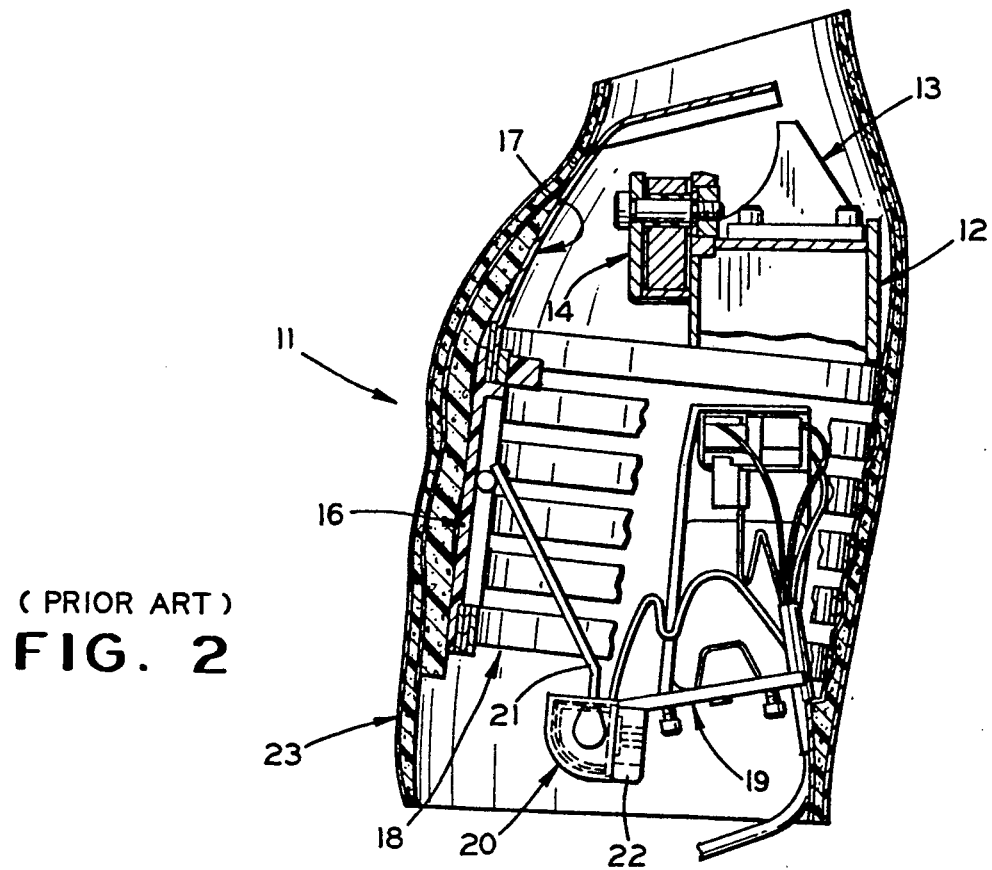
(PRIOR ART) FIG. 2

APPARATUS FOR SENSING DEFLECTION IN A CRASH TEST DUMMY THORAX

BACKGROUND OF THE INVENTION

The present invention relates generally to crash test dummies and, in particular, to an apparatus for measuring deflection in the thorax of a crash test dummy.

The U.S. Pat. No. 3,841,163 discloses an anthropomorphic crash test dummy employing a plurality of strain gauges embedded in a predetermined pattern in each of a pair of iliac-contoured surfaces located on the dummy. The existence or nonexistence of a sensor readout and its shape is effective to indicate either or both a skewed or submarining position of the dummy.

The U.S. Pat. No. 4,161,874 discloses a system for measuring head and neck impact forces with an anthropometric dummy head and neck member secured to a movable plate member. Three force measuring cells are positioned in a horizontal plane and are connected between the movable plate and three column members. Three similar vertical force measuring cells are positioned between a support plate and the movable plate member. High frequency response triaxial accelerometers are mounted at the center of gravity of the dummy head and neck member and on the movable plate member adjacent the attachment of the dummy head an neck member.

The U.S. Pat. No. 4,409,835 discloses triaxial load cells appropriately arrayed to measure the load distribution imposed by a restraint system on the chest of a crash test dummy.

The U.S. Pat. No. 4,691,556 discloses a crash dummy head for measuring impact surface forces and pressures experienced during automotive crash testing. A pressure-sensing face utilizing pressure-sensitive electric films is incorporated into a dummy skull structure.

The U.S. Pat. No. 4,701,132 discloses a crash dummy in which sensors (strain gauges) measure the force on each individual spring rib member during a simulated accident.

The U.S. Pat. No. 4,873,867 discloses an apparatus for measuring the acceleration of the head or thoracic regions of an anthropomorphic dummy used in crash testing. Three pairs of accelerometers are mounted within test site cavities provided in the crash dummy for measuring acceleration during crash tests to obtain redundant force signals.

Test dummies are a very important tool for use in evaluating the crash-worthiness of vehicles. In fact, such dummies have become the stars of television, radio and print media advertisements. In the field of automotive crash test research, various types of dummies have been developed to represent a range of sizes of adults and children associated with the human population.

A full line of anthropomorphic test dummies is available from First Technology Safety Systems, Inc. of Plymouth, Mich. Included in the line are a BioSID side impact test dummy, Hybrid III test dummies in ninety-fifth percentile male, fifth percentile female, and fiftieth percentile configurations, a Side Impact model 572-SID test dummy, a Hybrid II fiftieth percentile test dummy, six-year-old and three-year-old child test dummies, a three-year-old airbag test dummy, a model CAMI-II infant test dummy, and VIP model test dummies in ninety-fifth and fifth percentile configurations.

The BioSID test dummy utilizes Hybrid III head neck and leg assemblies and six ribs which are an adaptation of the Hybrid III design constructed from vascomax steel and oriented 90° so that the faces of the ribs are turned toward the area of impact. The BioSID pelvis is capable of accepting a pubic and sacrum load cell. The Hybrid III ninety-fifth percentile male and the Hybrid III fifth percentile female test dummies include a three- or six-axis neck transducer, submarining indicator pelvis, chest displacement transducer, tibia-femur displacement transducers and mounts for head, chest and pelvis accelerometers. The Hybrid III fiftieth percentile test dummy eliminates the submarining indicator pelvis used on the other Hybrid III dummies and meets the specifications for the FMVSS 208 option specified in 49 CFR Part 572 Subpart E.

The Side Impact model 572-SID test dummy meets the specifications for the FMVSS 208 standard specified in 49 CFR Part 572 Subpart F utilizing Hybrid II head, neck and lower leg assemblies with upper and lower torso assemblies designed for side impacts. The Hybrid II fiftieth percentile test dummy meets the specifications for the FMVSS 208 standard specified in 49 CFR Part 572 Subpart B including mounts for head, chest and pelvis accelerometers.

The six-year-old child test dummy meets the specifications for the proposed FMVSS 208 standard and includes mounts for head, chest and pelvis accelerometers. The three-year-old test dummy meets the specifications for the FMVSS 213 standard specified in 49 CFR Part 572 Subpart C and includes mounts for head and chest accelerometers.

The three-year-old child airbag test dummy is of an experimental sit/stand construction. The infant test dummy meets the specifications for the FMVSS 213 standard specified in 49 CFR Part 572 Subpart D. and includes mounts for head, chest and pelvis accelerometers. The VIP test dummies include mounts in the head and chest for accelerometers.

SUMMARY OF THE INVENTION

The present invention concerns an apparatus for measuring the deflection of a thorax of an anthropomorphic dummy. A displacement sensor includes a base for mounting on a thoracic spine assembly, a tape drum having a body rotatably mounted on the base, at least a pair of spring tapes each having one end connected to the base and an opposite end attached to the tape drum body, the spring tapes biasing the tape drum for rotation in a predetermined direction, and a displacement tape having one end attached to and being wound about the tape drum body in a direction opposite the predetermined direction and having an opposite end for attachment to a rib set of the dummy. The sensors are mounted in four pairs on the spine assembly and the opposite end of the displacement tapes of each pair are attached together to a different point on the rib set. The sensors in each pair are spaced apart a first predetermined distance along a Y axis and a ninth sensor is spaced a second predetermined distance from one of the other sensors along a Z axis. Deflection of the rib set toward the thoracic spine assembly will cause the tape drums to rotate in the predetermined direction to wind up the displacement tapes to indicate the deflection of the rib set through triangulation.

Each of the sensors includes an output shaft attached to the tape drum body and mounted for rotation in a bearing attached to the base, a potentiometer attached to the base and coupled to the output shaft for generating an output signal representing a position of the opposite end of the displacement tape, and a pair of spring drums rotatably mounted on the base and each being attached to the one end of an associated one of the spring tapes and being positioned on the base approximately diametrically opposed about the tape drum. A pair of rods are attached to the base and extend generally parallel to one another and the opposite end of the displacement tape extends between the rods.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a front elevation view of a prior art crash test dummy thorax assembly;

FIG. 2 is a cross-sectional view of the prior art thorax assembly taken along the line 2—2 in the FIG. 1;

DESCRIPTION OF THE PREFERRED EMBODIMENT

Figure 3:
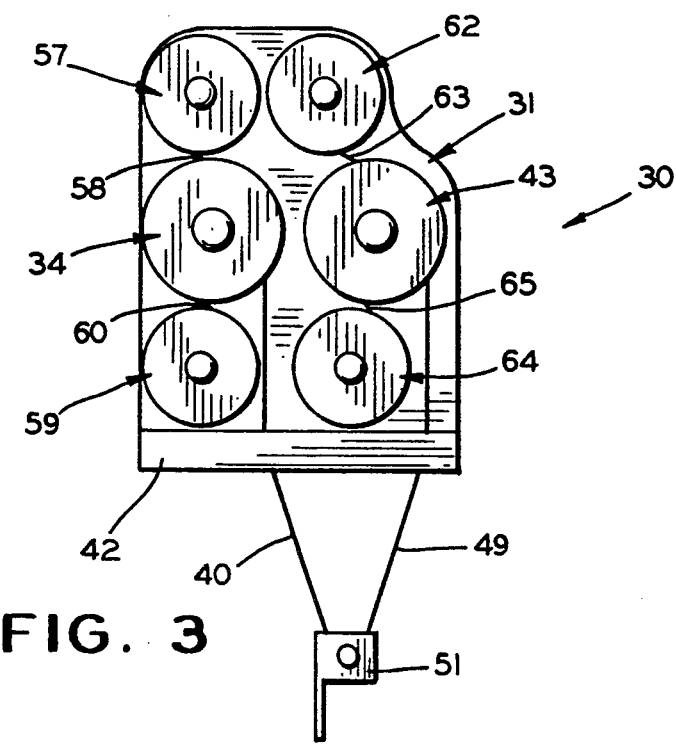
FIG. 3 is a top plan view of a deflection sensor apparatus for use with the crash test dummy thorax shown in the FIG. 1.

There is shown in the FIGS. 1 and 2 an upper torso assembly 11 for a vehicle crash test dummy of the type currently available from First Technology Safety Systems of Plymouth, Mich. The upper torso assembly 11 includes a thoracic spine assembly 12 having a lower neck bracket assembly 13 attached at an upper end thereof. Also attached to the upper end of the thoracic spine assembly 12 is a pair of clavicle link assemblies 14. Each of the link assemblies 14 has one end pivotally attached to the spine assembly 12 and an opposite end pivotally attached to an associated one of a pair of clavicle assemblies 15. A sternum assembly 16 is positioned at the front of the torso 11. A bib assembly 17 connects the sternum assembly 16 to a rib set 18. Attached to the bottom end of the thoracic spine assembly 12 is an adaptor assembly 19. Mounted on the adaptor assembly 19 is a chest deflection transducer assembly 20. The transducer assembly 20 includes a transducer arm 21 having a lower end rotatably attached to the shaft of a potentiometer 22 and an upper end coupled to the sternum assembly 16. The upper torso assembly 11 is covered by a chest flesh and skin assembly 23 which is open at the upper and lower ends thereof.

During crash testing, if pressure is applied to the front of the upper torso assembly 11, the rib set 18 will tend to deflect inwardly. The amount of deflection of the chest area is an important component of the information to be gathered during a crash test. In the prior art upper torso assembly 11, the only means for gathering chest deflection information is the chest deflection transducer assembly 20. The chest area at the front of the rib set 18 can be considered as a rectangular plane having longer horizontal edges and shorter vertical edges. The upper end of the transducer arm 21 is coupled at approximately the center point of the sternum assembly 16. If force is applied to the front of the upper torso assembly 11 at the center point of the plane, the plane will be deflected inwardly with each of the four corners moving the same amount such that the deflection measured by the transducer arm 21 and the potentiometer 22 would be a fairly accurate indication of the amount of deflection of the rib set 18.

However, typically the forces are not applied at the exact center point of the plane representing the front of the rib set 18. A single force could be applied at any point in the imaginary plane or, more likely, a plurality of different forces can be applied at different points resulting in a composite force vector displaced from the center point of the imaginary plane. Thus, the average deflection of the chest plane is being measured. Another problem with the prior art chest deflection transducer assembly 20 is that the ratio of a unit of angular rotation of the pot to a unit of horizontal deflection of the rib set changes during deflection because the vertical distance between the potentiometer shaft and the upper end of the arm 21 increases as the chest is deflected.

The accuracy of the chest deflection measurement can be increased by measuring the deflection of the four corners of the chest plane separately. For the reasons stated above is is not desirable to use four of the chest deflection transducer assemblies 20, one for each corner. The distance from the front of the rib set to the back of the rib set is approximately seven inches and the ribs can displace approximately a maximum of four inches during testing. A string pot could be utilized in place of the transducer arm 21 and the potentiometer 22. However, a string pot which provides four inches of displacement would require a relatively large diameter drum wound with steel thread. Such a drum would have high friction and high inertia due to the mass. Furthermore, the steel thread can stretch and string pots are biased with clock strings which do not provide a constant force.

Figure 4:
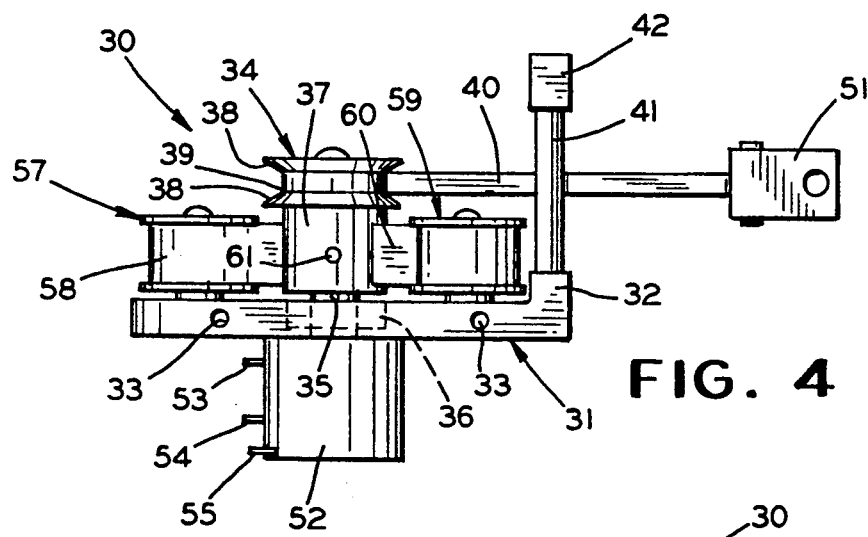
FIG. 4 is a left side elevation view of the sensor apparatus shown in FIG. 3.
Figure 5:
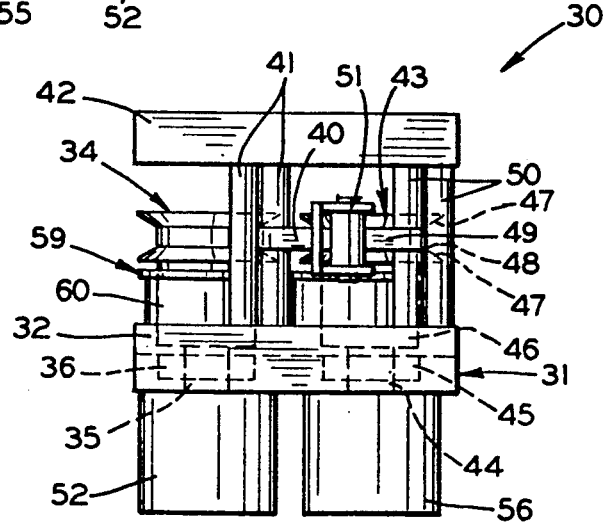
FIG. 5 is a front elevation view of the sensor apparatus shown in the FIG. 3.

There is shown in the FIGS. 3-5, a deflection sensor assembly 30 incorporating a first pair of deflection sensors in accordance with the present invention. The sensor assembly 30 is relatively small in size, provides a constant spring force which is lower than the spring force of a spring pot for the same displacement and eliminates other measurement inaccuracies generated in the prior art measurement systems. The sensor assembly 30 can be used to triangulate four corner thorax deflection in the X, Y and Z axes. The arrangement of dual sensors permits precise control of the distance at the base of a measurement triangle to minimize errors. Furthermore, the sensors are capable of measuring relatively long distances with minimal effect on the speed of response.

Each of the sensors in the assembly 30 utilizes a very low inertia (low mass and low volume) tape drum. Constant force spiral wound springs attached to the tape drum minimize force and speed variations over the range of travel. The springs are arranged in pairs to exert only rotational forces on the tape drum and an associated potentiometer and minimize frictional forces on the bearings. A high strength very thin steel tape is used for the springs and the displacement tape to minimize errors due to changes in the drum diameter and stretching.

The sensor assembly 30 has a generally planer base 31 with an upstanding flange 32 formed along a front edge thereof. A pair of threaded mounting apertures 33 are formed in a right side surface of the base. Mounted for rotation about a generally vertical axis on an upper surface of the base 31 is a first tape drum 34 attached to a first output shaft 35. The shaft 35 extends through a first bearing 36 recessed below the upper surface of the base 31. The drum 34 has a first drum body 37 with a first pair of flanges 38 extending circumferentially about an upper end thereof to form a first groove 39. A first displacement tape 40 has one end attached to the drum body 37 in the groove 39 and is wound about the drum body several turns in a clockwise direction. A first pair of generally vertically extending rods 41 each have a lower end attached to the upstanding flange 32 and an upper end attached to a generally horizontal bar 42 extending parallel to and approximately the same length as the flange 32. The rods 41 are closely spaced and the tape 40 has an opposite end which extends between the rods.

A second tape drum 43 is mounted for rotation about a generally vertical axis on an upper surface of the base 31. The second tape drum 43 attached to a second output shaft 44 which extends through a second bearing 45 recessed below the upper surface of the base 31. The drum 43 has a second drum body 46 with a second pair of flanges 47 extending circumferentially about an upper end thereof to form a second groove 48. A second displacement tape 49 has one end attached to the drum body 46 in the groove 48 and is wound about the drum body several turns in a clockwise direction. A second pair of generally vertically extending rods 50 each have a lower end attached to the upstanding flange 32 and an upper end attached to the bar 42. The rods 50 are closely spaced and the tape 49 has an opposite end which extends between the rods. The opposite ends of the tapes 40 and 49 are attached to a connector 51.

The first tape drum 34 is coupled by the first output shaft 35 to drive a first potentiometer POT1 52 mounted on a lower surface of the base 31. The potentiometer 52 has a first terminal 53 connected to one end of an internal resistor, a second terminal 53 connected to an opposite end of the resistor and a third terminal 55 connected to a slider in electrical contact with and driven along the resistor by the first output shaft 35. The terminals of the potentiometer 52 can be connected to a reference voltage source (not shown) in a known manner to generate a first output signal representing the angular position of the first output shaft 35 and, thus, representing the length of the displacement tape 40 extended from the tape drum 34. A second potentiometer POT2 56, similar to the first potentiometer 52, is mounted on the lower surface of the base 31 and is driven by the second output shaft 44 to generate a second output signal representing the length of the displacement tape 49 extended from the tape drum 43.

Also rotatably mounted on the upper surface of the base 31 is a first spring drum 57 positioned between the first tape drum 34 and a rear edge of the base 31. Wound about the first spring drum 57 in a counterclockwise direction is a first spring tape 58. The tape 58 has one end attached to the spring drum 57 and an opposite end attached to the first tape drum 34. A second spring drum 59 is rotatably mounted on the base 31 and is positioned between the first tape drum 34 and the flange 42. Wound about the second spring drum 59 in a counterclockwise direction is a second spring tape 60 having one end attached to the spring drum 59 and an opposite end attached to the tape drum 34. The ends of the spring tapes 58 and 60 are attached to the tape drum 34 and to the spring drums 57 and 59 by suitable fastening means such as a roll pin 61 extending into an aperture formed in the tape drum 34 and an aperture (not shown) formed in the spring tape 60. Also rotatably mounted on the upper surface of the base 31 is a third spring drum 62 positioned between the second tape drum 43 and the rear edge of the base 31. Wound about the third spring drum 62 in a counterclockwise direction in a third spring tape 63. The tape 63 has one end attached to the spring drum 62 and an opposite end attached to the second tape drum 43. A fourth spring drum 64 is rotatably mounted on the base 31 and is positioned between the second tape drum 43 and the flange 42. Wound about the fourth spring drum 64 in a counterclockwise direction is a fourth spring tape 65 having one end attached to the spring drum 64 and an opposite end attached to the tape drum 43. The ends of the spring tapes 63 and 65 are attached to the tape drum 43 and to the spring drums 62 and 64 by suitable fastening means.

If the connector 51 is pulled away from the base 31, the tape drums 34 and 43 will be rotated in a clockwise direction. The clockwise direction of rotation of the tape drum 34 will wind the spring tapes 58 and 60 about the first drum body 37 and unwind these tapes from the first spring drum 57 and the second spring drum 59 respectively. The spring tapes 58 and 60 contact the tape drum 34 at diametrically opposed points to eliminate side loading on the tape drum 34. The clockwise direction of rotation of the tape drum 43 will wind the spring tapes 63 and 65 about the second drum body 46 and unwind these tapes from the third spring drum 62 and the fourth spring drum 64 respectively. The spring tapes 63 and 65 contact the tape drum 43 at diametrically opposed points to eliminate side loading on the tape drum 43. Furthermore, the spring tapes 58, 60, 63 and 65 are formed from a thin steel material to provide about sixteen ounces of spring force preload on the first displacement tape 40 and the second displacement tape 49. The sixteen ounce spring force is much less than the approximately forty-eight to sixty-four ounces of spring force which would applied by a string pot capable of measuring four inches of deflection.

Figure 6:
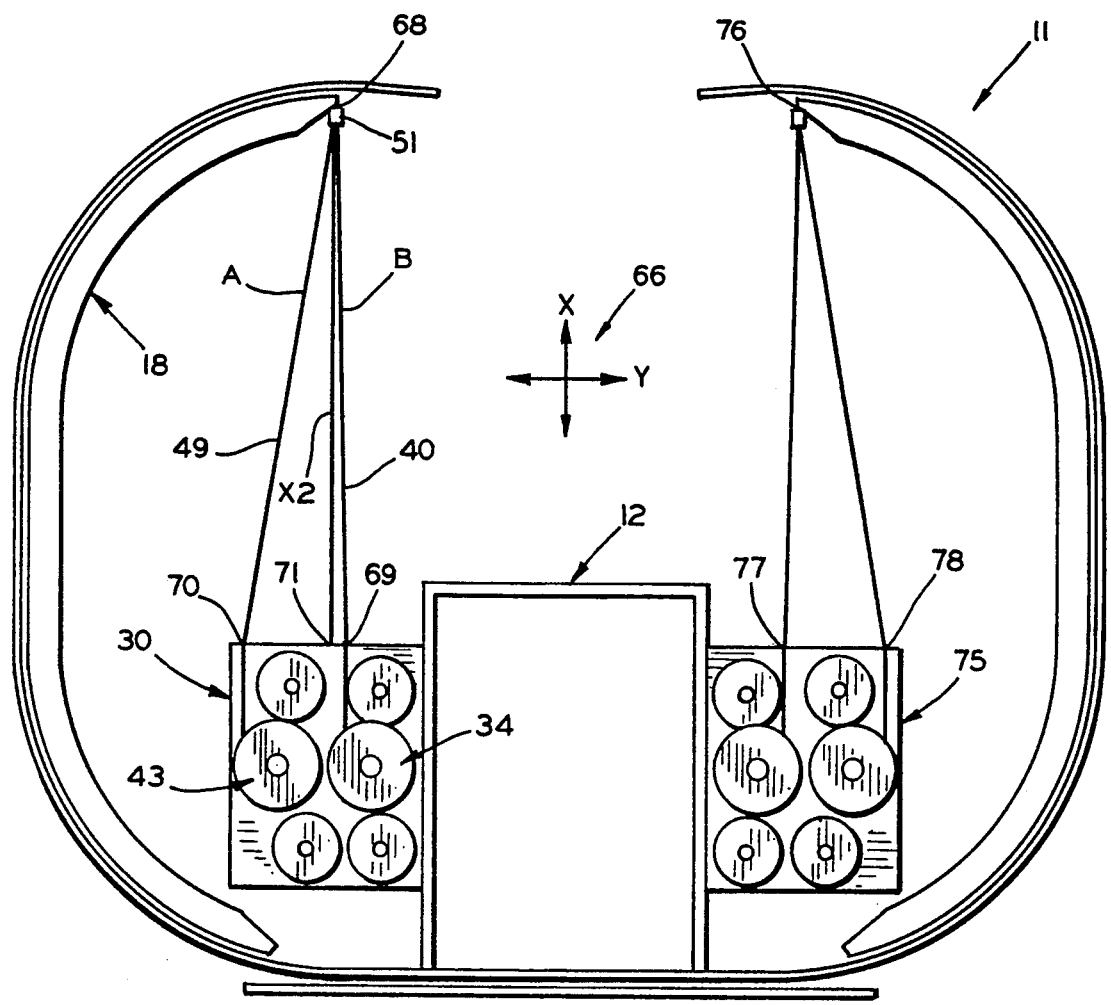
FIG. 6 is a schematic top plan view of a crash test dummy thorax assembly incorporating the sensor apparatus shown in the FIG. 3.
Figure 7:
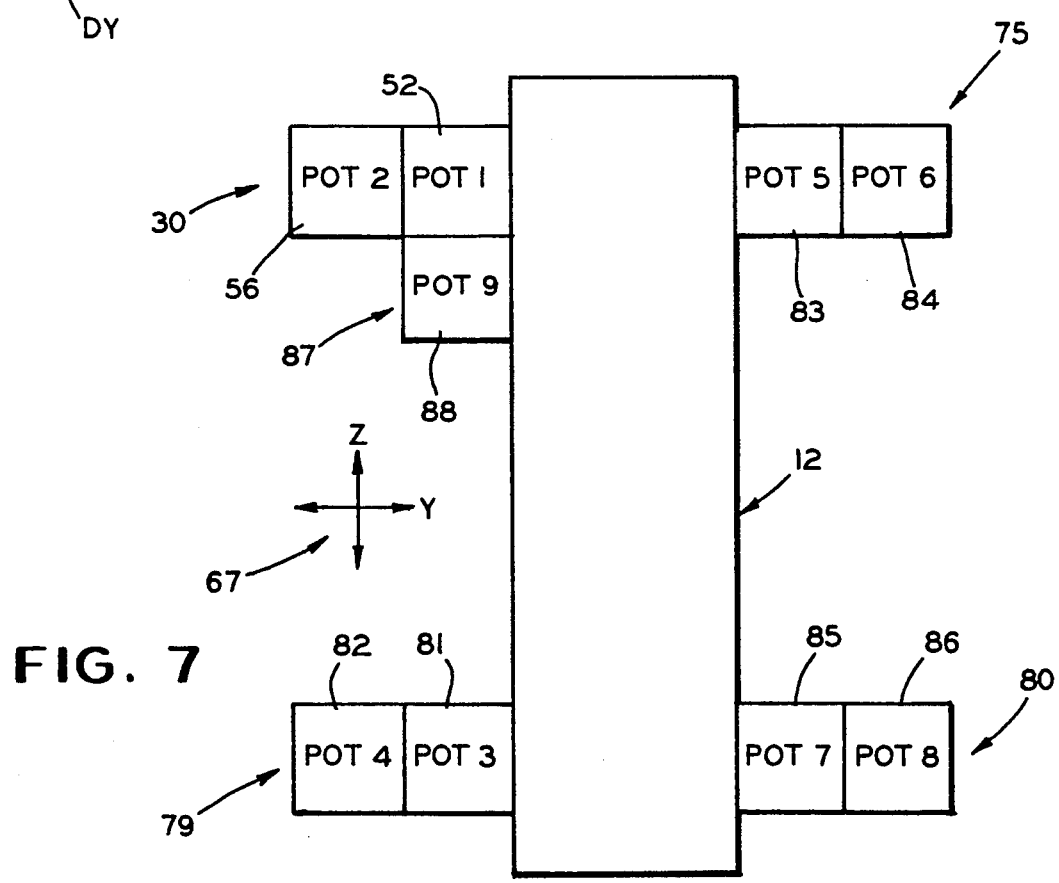
FIG. 7 is a schematic rear elevation view of the thorax spine assembly shown in the FIG. 6.

One of the deflection sensor assemblies 30 can be attached to each of the four corners of the imaginary front plane of the rib set 18 to measure chest deflection in a vehicle test dummy. There is shown in the FIG. 6 a schematic top plan view of the upper torso assembly 11 with the rib set 18 attached to the thoracic spine assembly 12. The FIG. 7 is a schematic rear elevation view of the thoracic spine assembly 12. Deflections of the rib set 18 can be measured with reference to orthogonal X, Y and Z axes. In the FIG. 6, there are shown an X axis and a Y axis 66. In the FIG. 7, there are shown the Y axis and a Z axis 67. The deflection sensor assembly 30 is mounted on the spine assembly 12 and the first displacement tape 40 and the second displacement tape 49 are extended to attach the connector 51 to an upper left front corner of the rib set 18 at a first attachment point 68. The deflection of the first point of attachment 68 can be measured in a generally horizontal plane with respect to the orthogonal X and Y axes 66. In a similar manner, the deflection of the first point of attachment 68 can be measured in a generally vertical plane with respect to the orthogonal Y and Z axes 67. As shown in the FIG. 6, the displacement tape 40 extends between the first point of attachment 58 and a first fixed reference point 69 at the contact point of the tape 40 with the first pair of rods 41. The displacement tape 49 extends between the first attachment point 68 and a second fixed reference point 70 representing the point of contact of the tape 49 with the rods 53. In a triangular plane formed by the points 68, 69, and 70, a line drawn between the points 69 and 70 is considered to be the base of the triangle. A line X2 can be drawn from the point 68 perpendicular to the base line representing the distance between the first attachment point 68 and a first variable reference point 71 on the base line. The location of the reference point 71 will change as the rib set 18 is deflected.

Figure 8:
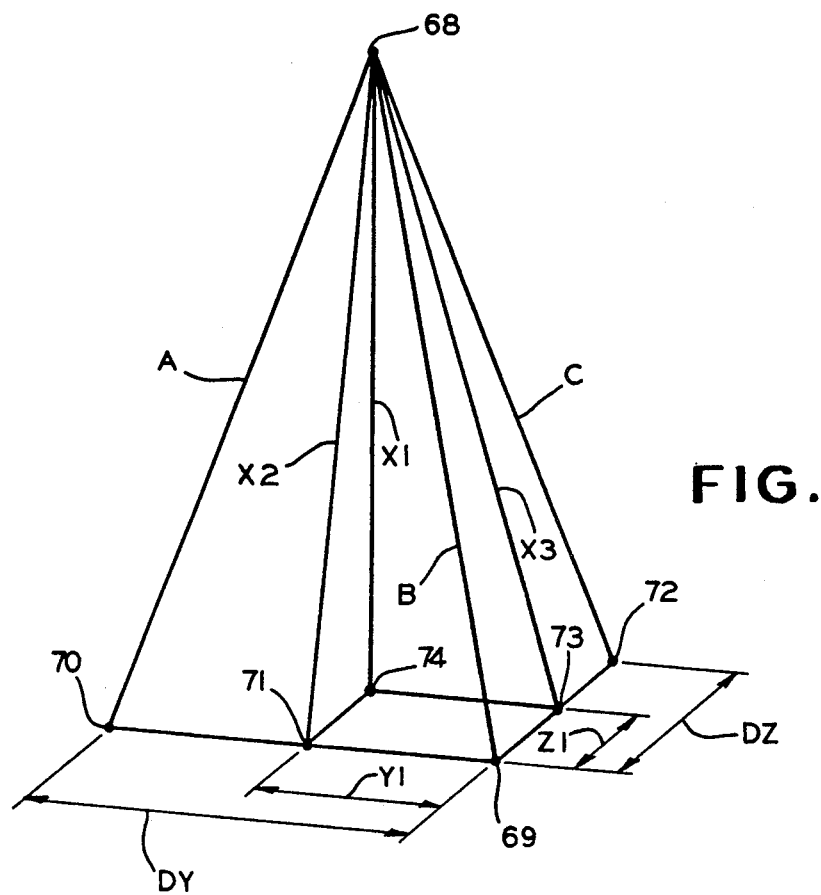
FIG. 8 is a schematic representation of the thorax reference points and deflection distances measured by the sensors shown in the FIGS. 6 and 7.

The relationship between the points 68, 69, 70, and 71 is shown in the schematic representation of FIG. 8. The base of the triangle is the distance between the points 69 and 70 along the Y axis which is designated as DY. The distance between the first fixed reference point 69 and the variable reference point 71 along the Y axis will vary in response to the deflection of the rib set 18 and is designated as Y1. The sides of the triangle are the distance between the points 68 and 70 designated as A and the distance between the points 68 and 69 designated as B. A third fixed reference point 72 is shown in the FIG. 8. The point 72 is displaced from the first fixed reference point 69 along the Z axis by a distance designated as DZ. The third fixed reference point 72 can be, for example, a contact point for a displacement tape associated with another displacement sensor (not shown). This additional sensor can be similar in construction to either one of the deflection sensors associated with the sensor assembly 30. If the end of the displacement tape associated with the point 72 is attached at the first attachment point 68, the distance between the point 68 and the third fixed reference point 72 can be designated as C. The points 68, 70 and 72 define a second triangular plane having a base extending along the Z axis between the points 69 and 72 and designated as DZ. If a line X3 is drawn from the point 68 perpendicular to the base of the second triangle, the line contacts the base line at a variable reference point 73. The distance between the second fixed reference point 69 and the variable reference point 73 along the Z axis will vary in response to the deflection of the rib set 18 and is designated as Z1. If lines are extended from the point 71 along the Z axis and from the point 73 along the Y axis, these lines will intersect at a third variable reference point 74. The distance between the first attachment point 68 and the reference point 74 is designated X1 which is the distance between the point of attachment 68 at the upper left corner of the rib set 18 and a generally vertically extending plane containing the fixed reference points 69, 70 and 72. By sensing the changes in the lengths of the triangle sides A, B and C, any change in the distance X1 can be calculated using triangulation. The formulas are as follows:

$$X2^2 = A^2 - (DY - Y1)^2 \quad X2^2 = B^2 - Y1^2$$

Solve for $Y1 = (B^2 - A^2 + DY^2)/2 \cdot DY$ $$X3^2 = C^2 - (DZ - Z1)^2 \quad X3^2 = B^2 - Z1^2$$

Solve for $Z1 = (B^2 - C^2 + DZ^2)/2 \cdot DZ$ $$X1^2 = B^2 - Y1^2 - Z1^2$$

A change in X1 is the actual thorax deflection at the attachment point.

A change in Y1 is the deflection along the Y axis.

A change in Z1 is the deflection along the Z axis.

The distance X1 can be calculated in a similar manner for each of the other corners of the rib set 18. As shown in the FIGS. 6 and 7, a second pair of deflection sensors 75 are attached to the spine assembly 12. A pair of displacement tapes extend from the sensor assembly 75 to a second attachment point 76 at an upper right corner of the rib set 18. The point 76, a fourth fixed reference point 77 and a fifth fixed reference point 78 define a triangle for measuring displacement along the Y axis. Since the individual ribs of the rib set 18 are attached to the sternum assembly 16, the previously measured Z axis displacement will be the same for the purpose of calculating the X axis displacement X1. A third pair of deflection sensors 79 and a fourth pair of deflection sensors 80 are attached to the spine assembly 12 for connection to the lower left corner and the lower right corner respectively of the rib set 18.

The sensor assembly 79 has associated therewith a potentiometer POT3 81 and a potentiometer POT4 82 for generating third and fourth output signals respectively. The sensor assembly 75 has associated therewith a potentiometer POT5 83 and a potentiometer POT6 84 for generating fifth and sixth output signals respectively. The sensor assembly 80 has associated therewith a potentiometer POT7 85 and a potentiometer POT8 86 for generating seventh and eighth output signals respectively. A single sensor assembly 87 is attached to the spine assembly 12 below the potentiometer POT1 52 and has associated therewith a potentiometer POT9 88 for generating a ninth output signal representing C distance. Of course the potentiometer 88 could be positioned adjacent any of the potentiometer 81, 83 and 85 also.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A sensor for measuring the deflection of a thorax of an anthropomorphic dummy comprising:

a base means for mounting on a thoracic spine assembly of an anthropomorphic dummy, said base means comprising a base;

a tape drum having a body rotatably mounted on said base;

at least a pair of spring tapes each having one end connected to said base and an opposite end attached to said body of said tape drum, said spring tapes biasing said tape drum for rotation in a predetermined direction; and a displacement tape having one end attached to and being wound about said body of said tape drum in a direction opposite said predetermined direction and having an opposite end for attachment to a rib set of an anthropomorphic dummy whereby when said base is attached to a thoracic spine assembly and said opposite end of said displacement tape is attached to a rib set, deflection of the rib set toward the thoracic spine assembly will cause said spring tapes to rotate said tape drum in said predetermined direction to wind up said displacement tape to indicate the deflection of the rib set.

2. The sensor according to claim 1 including means for generating output signals representing a position of said opposite end of said displacement tape, said means for generating being connected to said tape drum.

3. The apparatus according to claim 1 wherein said tape drum includes an output shaft attached to said body and mounted in a bearing attached to said base.

4. The sensor according to claim 3 including a potentiometer attached to said base and coupled to said output shaft for generating an output signal representing a position of said opposite end of said displacement tape.

5. The sensor according to claim 1 including a pair of spring drums rotatably mounted on said base, each of said spring drums being attached to said one end of an associated one of said spring tapes.

6. The sensor according to claim 5 wherein said spring drums are positioned on said base approximately diametrically opposed about said tape drum.

7. The sensor according to claim 1 wherein said tape drum body has a pair of spaced apart circumferentially extending flanges formed thereon and said displacement tape is wound on said body between said flanges.

8. The sensor according to claim 1 including a pair of rods attached to said base and extending generally parallel to one another, said opposite end of said displacement tape extending between said rods.

9. The sensor according to claim 1 including an output shaft attached to said body of said tape drum and mounted for rotation in a bearing attached to said base, a potentiometer attached to said base and coupled to said output shaft for generating an output signal representing a position of said opposite end of said displacement tape, a pair of spring drums rotatably mounted on said base and each being attached to said one end of an associated one of said spring tapes and being positioned on said base approximately diametrically opposed about said tape drum, and a pair of rods attached to said base and extending generally parallel to one another, said opposite end of said displacement tape extending between said rods.

10. A sensor system for measuring the deflection of a thorax of an anthropomorphic dummy comprising:
a base means for mounting on a thoracic spine assembly of an anthropomorphic dummy, said base means comprising a base;
a pair tape drums rotatably mounted to said base;
means for biasing each of said tape drums for rotation in a predetermined direction;
a pair of displacement tapes each having one end attached to and wound about an associated one of said tape drums and having an opposite end for attachment to a rib set of an anthropomorphic dummy; and
means for generating output signals representing a position of said opposite ends of said displacement tapes, said means for generating being connected to said tape drums.

11. The sensor system according to claim 10 wherein said means for biasing includes two pairs of spring drums and four spring tapes, each said pair of spring drums being associated with one of said tape drums, each of said spring drums being rotatably attached to said base, each of said spring tapes having one end attached to and wound about an associated one of said spring drums and an opposite end attached to said body of said associated tape drum for biasing said associated tape drum for rotation in said predetermined direction.

12. The sensor according to claim 10 including a pair of potentiometers attached to said base, each of said potentiometers being coupled to an associated one of said tape drums for generating said output signal representing the position of said opposite end of said displacement tape attached to said associated tape drum.

13. The sensor according to claim 10 including two pairs of rods attached to said base and extending generally parallel to one another, said opposite end of each of said displacement tapes extending between an associated one of said pairs of rods.

14. A sensor system for measuring the deflection of a thorax of an anthropomorphic dummy comprising:
a plurality of displacement sensors, each of said sensors having a base means for attachment to a thoracic spine assembly of an anthropomorphic dummy, said base means comprising a base, a tape drum rotatably mounted on said base, and a displacement tape having one end attached to and wound about said tape drum and having an opposite end for attachment to a rib set of the anthropomorphic dummy;
means for generating output signals coupled to said tape drums; and
means for biasing said tape drums for rotation in a predetermined direction.

15. The system according to claim 14 wherein said opposite ends of said displacement tapes are connected together in pairs for attachment to different points on the rib set.

16. The system according to claim 14 wherein said plurality of displacement sensors includes at least four pairs of said displacement sensors and said opposite ends of said displacement tapes associated with each of said pairs of displacement sensors are connected together for attachment to four different points on the rib set.

17. The system according to claim 16 wherein said plurality of displacement sensors includes a ninth one of said displacement sensors and said opposite end of said displacement tape associated with said ninth displacement sensor is connected to said opposite ends of said displacement tapes of one of said pairs of said displacement sensors.

18. The system according to claim 14 wherein said means for generating displacement signals includes a potentiometer for generating said output signal for an associated one of said displacement sensors, said tape drum of said associated one of said sensors being connected to said potentiometer, said output signal generated by said potentiometer representing a position of said opposite end of said displacement tape of said associated one of said sensors with respect to said base of said associated one of said sensors.

19. The system according to claim 14 wherein said means for biasing includes at least one pair of spring drums and one pair of spring tapes for an associated one of said displacement sensors, each said pair of spring drums being rotatably attached to said base of said associated sensor, each of said spring tapes having one end attached to and wound about an associated one of said spring drums and an opposite end attached to said tape drum of said associated sensor for biasing said tape drum of said associated sensor for rotation in said predetermined direction.

20. The system according to claim 14 wherein a first and a second one of said displacement sensors are spaced apart a first predetermined distance along a first one of three orthogonal axes, a third one of said displacement sensors is spaced a second predetermined distance along a second one of the three orthogonal axes.

* * * * *